United States Patent [19]

Levine

[11] 4,076,196
[45] Feb. 28, 1978

[54] MULTI-USE MOTOR MOUNT

[76] Inventor: Fred Levine, 1330 - 99th St., Bay Harbor Islands, Fla. 33154

[21] Appl. No.: 692,271

[22] Filed: Jun. 3, 1976

[51] Int. Cl.² .......................... F16F 15/08; H02K 5/24
[52] U.S. Cl. .......................................... 248/14; 310/91
[58] Field of Search ...................... 248/14, 15, 16, 27; 310/91, 51, 162, 164

[56] References Cited

U.S. PATENT DOCUMENTS

| | | | |
|---|---|---|---|
| 1,786,192 | 12/1930 | Cullman | 310/91 X |
| 3,270,221 | 8/1966 | Shaffer | 310/91 X |
| 3,432,705 | 3/1969 | Lindtveit | 310/91 |
| 3,500,083 | 3/1970 | Dochterman | 310/51 |
| 3,746,289 | 7/1973 | Johnsen | 248/14 |
| 3,787,014 | 1/1974 | Story | 248/14 |
| 3,847,330 | 11/1974 | Morrison | 248/14 |
| 3,941,339 | 3/1976 | McCarty | 310/51 X |

Primary Examiner—J. Franklin Foss
Attorney, Agent, or Firm—Clarence A. O'Brien; Harvey B. Jacobson

[57] ABSTRACT

A kit for relocating mounting studs of replacement fan motors, and the like, includes a bracket provided with a slot or a pair of apertures, and the like. One of the apertures or the slot receives a mounting stud whose shank extends in a first direction, and the other of the apertures or the slot receives a bolt whose shank extends in a second direction opposite to the first direction. By arranging one or more brackets with the bolt of each retained in a respective mounting hole of a motor to be mounted, which motor has mounting holes disposed according to a first standard, the mounting studs will be offset a predetermined distance from the mounting holes of the motor permitting alignment of the studs with openings provided in a support member which are disposed according to a second standard.

7 Claims, 10 Drawing Figures

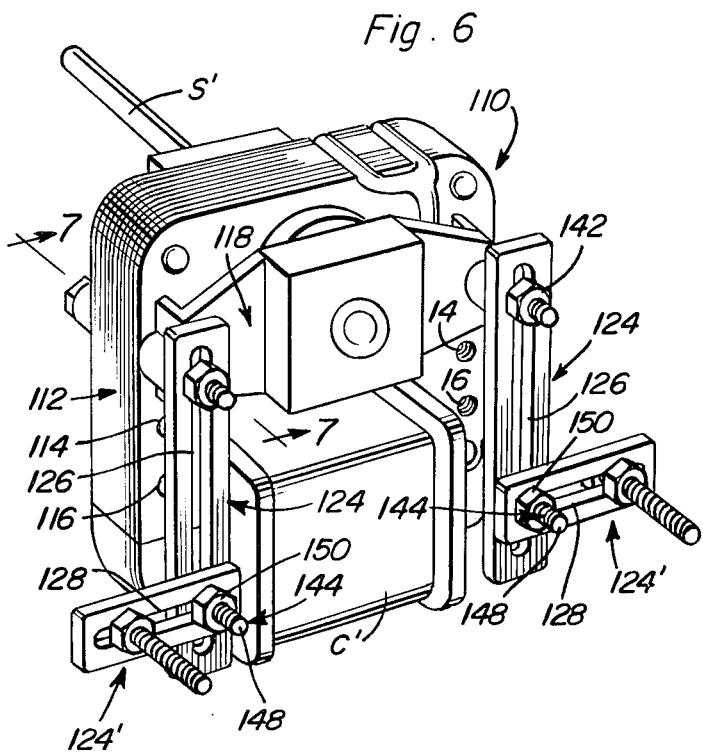
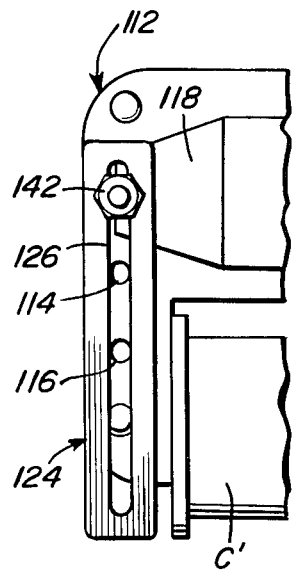
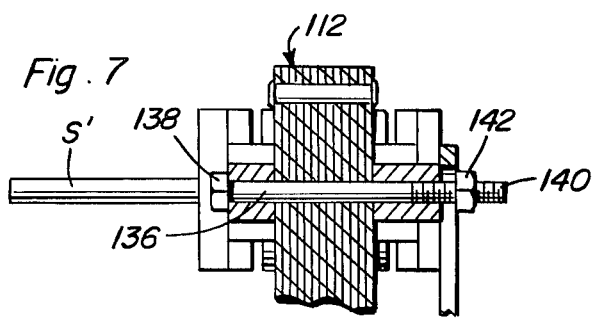
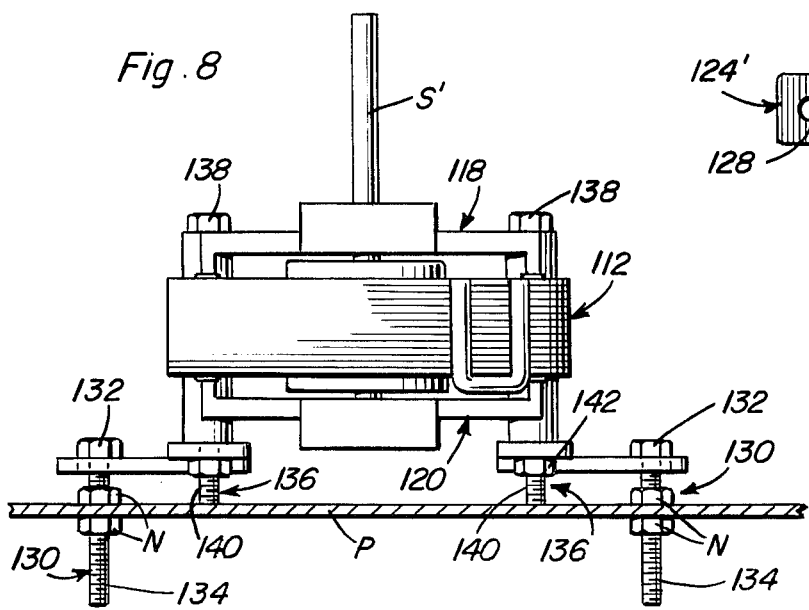

MULTI-USE MOTOR MOUNT

BACKGROUND OF THE INVENTION

1. Field of the Invention

This invention relates generally to the mounting of electric motors, and the like, and particularly to the mounting of a replacement fan motor for refrigerators, coolers, and the like, with an electric motor having mounting holes disposed on different centers than the mounting holes of the motor being replaced.

2. Description of the Prior Art

The maintenance of commercial refrigerators, coolers, and the like, frequently requires replacement of the fan motors employed in conjunction with the evaporator of such units. In this regard, a problem has developed inasmuch as although the replacement motors are generally of a single type having a commonly employed standard distance between the centers of the mounting holes of the motor, the mechanics frequently encounter units having fan motors provided with mounting holes spaced on a different standard. Thus, the usual replacement motor cannot be installed in such units without some sort of adaption being made or new mounting holes being drilled.

SUMMARY OF THE INVENTION

It is an object of the present invention to provide a kit which will permit mounting studs to be relocated relative to the mounting holes of a conventional replacement fan motor so as to allow the replacement fan motor to be installed in a unit having mounting holes of a different spacing than the mounting holes of the replacement fan motor.

It is another object of the present invention to provide a kit which permits relocation of mounting studs for mounting a replacement fan motor in a refrigeration unit provided with mounting holes of a spacing different from the spacing of the mounting holes of the replacement fan motor.

These and other objects are achieved according to the present invention by providing a kit including: a bracket provided with a slot or a pair of apertures; a mounting stud including a first head and a screw threaded first shank, with the first shank being arranged in the slot or in one of the apertures and extending from the bracket for attaching the bracket to a supporting member; a bolt including a second head and a screw threaded second shank, with the second shank being selectively arranged in the slot or the other of the apertures and extending from the bracket for being disposed in a mounting hole of a motor to be mounted; and a nut threadingly engaging the second shank and retaining the second shank in a mounting hole of the motor being mounted.

The bracket preferably is a substantially U-shaped channel provided with a planar back portion having a first surface and a second surface parallel to the first surface, and a pair of legs extending co-directionally in spaced relation from the back portion and facing the first surface, the head of the stud abutting the first surface of the back portion and being exposed between the legs of the bracket. The head of the bolt is consequently disposed abutting the second surface of the back portion.

Preferably, there are a plurality of brackets, mounting studs, retaining nuts, and pairs of bolts in order to permit two or more brackets to be put on a single replacement motor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view, partly in section, showing brackets forming a kit according to the present invention mounting a replacement fan motor on a supporting panel, and the like.

FIG. 6 is a perspective view showing another embodiment of adaptor brackets according to the invention mounted on a bearing bracket of a replacement fan motor.

FIG. 7 is an enlarged fragmentary, sectional view taken generally along the line 7—7 of FIG. 6.

FIG. 8 is a top plan view, partly in section, showing the brackets of FIG. 6 mounting a replacement fan motor on a supporting panel, and the like.

FIG. 9 is a fragmentary, front elevational view showing a portion of the bracket assembly of FIG. 6 mounted on a bearing bracket of a replacement fan motor.

FIG. 10 is a fragmentary, front elevational view, similar to FIG. 9, but showing another portion of the bracket assembly according to FIG. 6 mounted on a bearing bracket of a replacement fan motor.

DESCRIPTION OF THE PREFERRED EMBODIMENTS

Figure 1:
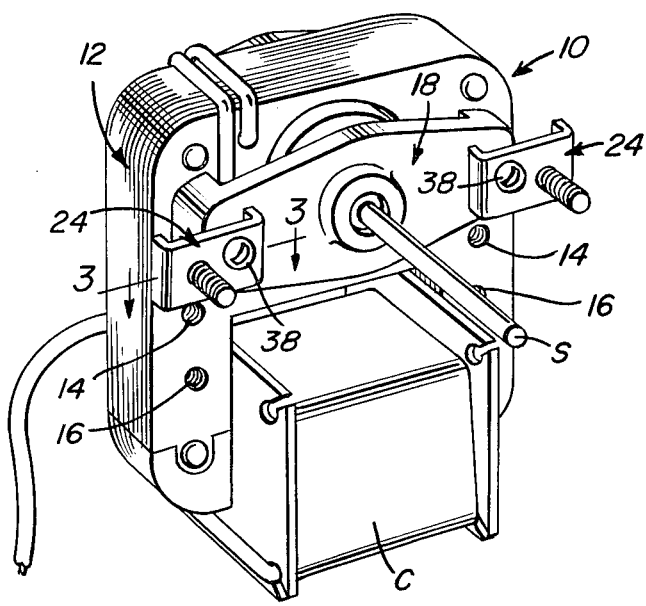
FIG. 1 is a perspective view showing a pair of adaptor brackets according to the invention mounted on a bearing bracket of a replacement fan motor.
Figure 2:
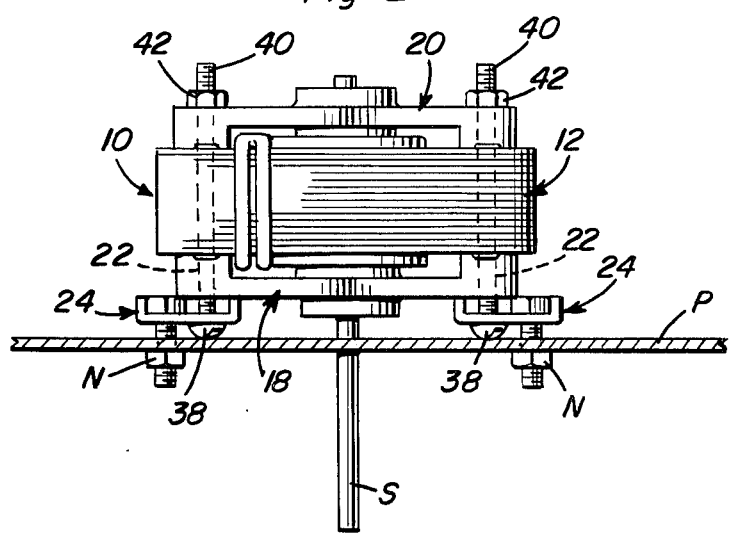
Figure 3:
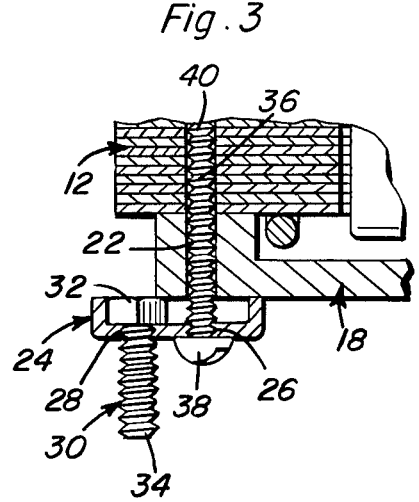
FIG. 3 is an enlarged, fragmentary, sectional view taken generally along the line 3—3 of FIG. 1.

Referring now more particularly to FIGS. 1 through 3 of the drawings, a replacement fan motor 10, and the like, is illustrated as formed by a body 12, which can be constructed in the conventional manner as a laminated, ferrous core. This body 12 is shown as provided with two pairs of mounting holes 14 and 16. Motor 10 also is partially formed by bearing brackets 18 and 20 in which are provided mounting holes 22. It is in the latter mounting holes, those designated 22, that relocating brackets 24 are illustrated as being mounted. Each bracket 24 is provided with a pair of apertures 26 and 28, in one of which apertures, specifically 26 as illustrated, a mounting stud 30 is disposed. Stud 30 includes a head 32 and a screw threaded shank 34, with the shank 34 being arranged in aperture 26 and disposed extending in a first direction away from bracket 24 for permitting attachment of bracket 24 to a support panel P, as shown in FIG. 2. Studs 30 may be retained on panel P in a conventional manner, as by the illustrated nuts N.

Motor 10 also includes, in the conventional manner, a coil C and an output shaft S, as can be seen in FIG. 1.

A bolt 36 is illustrated as being disposed in aperture 28. This bolt 36 includes a head 38 and a screw threaded shank 40, the latter being disposed in aperture 28 and extending in a second direction opposite to the direction in which extends shank 34 of stud 30 for being disposed in a mounting hole, such as a hole 22, of motor 10. A conventional nut 42, and the like, can threadingly engage shank 40 for retaining bolt 36 in mounting hole 22.

It will be appreciated that stud 30 can be arranged with shank 34 extending in the same direction as shank 40 provided bracket 24 is sufficiently long enough to clear the motor 10.

Figure 4:
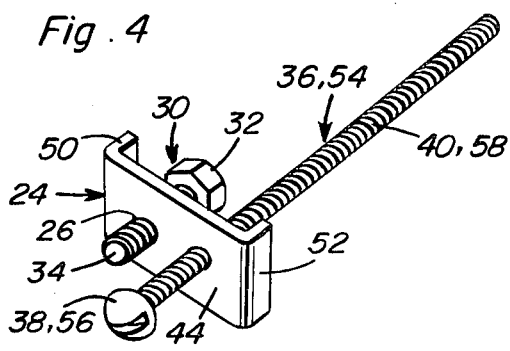
FIG. 4 is a perspective view showing a bracket assembly included in a kit according to the present invention.

Referring now to FIG. 4 of the drawing, each bracket 24 is preferably a substantially U-shaped channel provided with a planar back portion 44 having a first surface 36 and a second surface 48 substantially parallel to surface 46. A pair of legs 50 and 52 extend co-directionally in spaced relation from back portion 44, preferably at the peripheral portions transverse to the longitudinal extent of portion 44, and face first surface 46. The head 32 of stud 30 abuts surface 46 and is disposed between the legs 50 and 52, while head 38 of bolt 36 abuts surface 48 of back portion 44. In this manner, bracket 24 effectively forms a recess before the head 32 of stud 30 either in the orientation shown in FIGS. 1 through 3 of the drawing wherein only one of the legs 50 and 52 contacts the surface of the bearing bracket 18, or in an arrangement of bracket 24 which is not shown in the drawing wherein both legs 50 and 52 will contact the surface of bearing bracket 18 or body 12 when it is necessary to offset the location of the studs 30 in a direction other than that illustrated.

Figure 5:
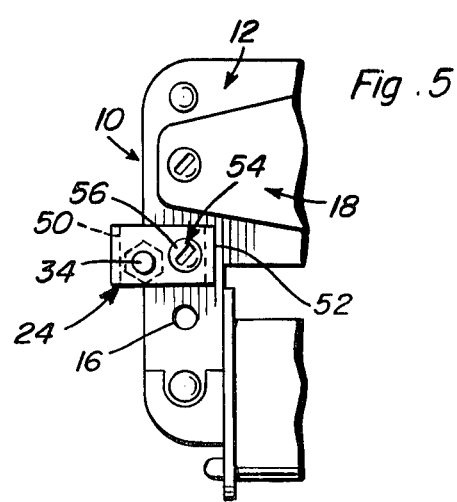
FIG. 5 is a fragmentary, front elevational view showing a bracket assembly according to the invention mounted in a mounting hole provided in the body of a replacement fan motor.

FIG. 5 of the drawing shows an arrangement wherein a bolt 54 including a head 56 and a shank 58 is disposed in one of the mounting holes 14 provided in body 12. Advantageously, shank 58 of bolt 54 is of a lesser length than shank 40 of bolt 36 such that in each instance the shank 34, 58 will extend only beyond the mounting hole 22, 14, 16 a distance sufficient for threadingly engaging a nut 42.

Although only a pair of apertures, 26 and 28 are shown as provided in bracket 24, it will be appreciated that more than two apertures could be provided in the bracket so as to increase the versatility and potential applications of the bracket assembly according to the invention.

In addition to the position shown in the drawing, a bracket 24 according to the invention can be mounted upside down or on its surface 48, or it can be turned about the bolt 36, 54, to any required angle. More specifically, bracket 24 can be rotated to provide an infinite number of mounting locations.

Referring now more particularly to FIGS. 6 through 8 of the drawings, a replacement fan motor 110, and the like, is illustrated as formed by a body 112 provided with two pairs of mounting holes 114 and 116. Motor 110 also is partially formed by bearing brackets 118 and 120 in which are provided mounting holes 122. It is in the latter mounting holes, those designated 122, that relocating brackets 124 and 124' are illustrated as being mounted. Each bracket 124 and 124' is provided with an elongated slot 126 and 128, respectively, in one of which, specifically slot 126 as illustrated, a mounting stud 130 is disposed. Stud 130 includes a head 132 and a screw threaded shank 134, with the shank 134 being arranged in slot 126 and disposed extending in a first direction away from bracket 124 for permitting attachment of bracket 124 to a support panel P', as shown in FIG. 8. Studs 130 may be retained on panel P' in a conventional manner, as by the illustrated nuts N.

A bolt 136 is illustrated as being disposed in slot 128. This bolt 136 includes a head 138 and a screw threaded shank 140, with the latter being disposed in slot 128 and extending in a second direction opposite to the direction in which extends shank 134 of stud 130 for being disposed in a mounting hole, such a hole 122, of motor 110. A conventional nut 142, and the like, can threadingly engage shank 140 for retaining bolt 136 in mounting hole 122.

It will be appreciated that, in a like manner to stud 30, stud 130 can be arranged with shank 134 thereof extending in the same direction as shank 140 provided the bracket 124, or the bracket 124', is arranged in such a manner that shank 134 will clear motor 110.

Each bracket 124, 124' is preferably a substantially a planar element, of different lengths, having first and second surfaces substantially parallel to one another. While FIGS. 6 through 8 show brackets 124 and 124' being used together, it is also possible to employ each of the brackets 124 and 124' individually. This is shown in FIG. 9 and 10, where brackets 124 and 124' are respectively shown mounted directly on bearing bracket 118 independently of the other bracket 124, 124'. Thus, it will be appreciated that many variations of mountings employing the brackets 124 and 124', which will advantageously be provided in a kit together with suitable nuts and bolts, can be provided in order to mount replacement fan motors in various makes of refrigeration units, and the like.

As can be understood from the above description and from the drawing, a bracket assembly according to the invention forms a kit which can permit fan motors, and the like, of a given mounting standard to replace fan motors of a different mounting standard in a quick, easy, and reliable manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for relocating mounting studs for replacement fan motors and the like, comprising in combination:
  a. a bracket provided with an opening means;
  b. a mounting stud including a first head and a screw threaded first shank, being arranged in the opening means and extending from the bracket for attaching the bracket to a supporting panel; and
  c. bolt means including a bolt comprising a second head and a screw threaded second shank, with the second shank being also selectively arranged in the opening means and extending from the bracket for being disposed in a mounting hole of a motor being mounted, the bracket being a substantially U-shaped channel provided with a planar back portion having a first surface and a second surface parallel to the first surface, the opening means being a pair of apertures provided in the back portion, one each for the stud and bolt, and a pair of legs extending co-directionally in spaced relation from the back portion and facing the first surface, the first head, that of the stud, abutting the first surface of the back portion and being disposed between the legs of the bracket, with the second head, that of the bolt, abutting the second surface.

2. Apparatus as defined in claim 1, further including a nut threadingly engaging each shank and retaining the shanks in respective mounting holes of a motor being mounted.

3. Apparatus as defined in claim 1, wherein the apparatus further includes a bracket comprising at least one substantially planar element having a first surface and a second surface parallel to the first surface, the opening means being an elongated slot provided in the planar portion.

4. Apparatus as defined in claim 3, wherein there is a further planar element provided with a further slot forming the opening means, and a fastener disposed in the slot and further slot for adjustably connecting the further element to the element.

5. In combination with a fan motor including a body provided with mounting holes and a bearing bracket also provided with mounting holes, a kit for relocating mounting studs of the fan motor in order to adapt the fan motor to a unit having mounting holes of different spacing than the mounting holes of the fan motor, the kit comprising, in combination:
 a. a bracket provided with an opening means;
 b. a mounting stud including a first head and a screw threaded first shank, with the first shank being arranged in the opening means for attaching the bracket to a mount; and
 c. bolt means including a bolt comprising a second head and a screw threaded second shank, with the second shank being arranged in the opening means in a direction for being disposed in one of the mounting holes of the motor, with the bracket being a substantially U-shaped channel provided with a planar back portion having a first surface and a second surface substantially parallel to the first surface, the opening means including a pair of apertures provided in the back portion, and a pair of legs extending co-directionally in spaced relation from the back portion and facing the first surface, the legs disposed for selective abutment against a bearing surface provided on the motor, the first head, that being of the stud, abutting the first surface of the back portion and being disposed between the legs of the bracket, with the second head, that being of the bolt, being disposed abutting the second surface of the bracket.

6. A combination as defined in claim 5, wherein the kit further includes a bracket comprising at least one substantially planar element having a first surface and a second surface parallel to the first surface, the opening means being an elongated slot provided in the planar portion.

7. A combination as defined in claim 5, wherein there are a pair of like brackets and the bolt means includes a pair of bolts, each having a head and a shank, and wherein the kit further includes a nut threadingly engaging each shank and retaining the shanks in respective mounting holes of a motor being mounted.

* * * * *